R. S. JENNINGS,

Assignor to J. LEVERING and G. O. MANNING, Trustees.

PACKING CASE.

No. 10,100. Reissued May 2, 1882.

WITNESSES

A. G. Heylmun.

S. S. Kane,

By his Attorney

INVENTOR

Ralph S. Jennings

M. Johnson

UNITED STATES PATENT OFFICE.

RALPH S. JENNINGS, OF BALTIMORE, MARYLAND, ASSIGNOR TO JOSHUA LEVERING, OF BALTIMORE, AND GEORGE O. MANNING, OF BALTIMORE COUNTY, MARYLAND, TRUSTEES.

PACKING-CASE.

SPECIFICATION forming part of Reissued Letters Patent No. 10,100, dated May 2, 1882.

Original No. 237,875, dated February 15, 1881. Application for reissue filed March 11, 1882.

*To all whom it may concern:*

Be it known that I, RALPH S. JENNINGS, a citizen of the United States of America, residing at Baltimore, in the county of Baltimore and State of Maryland, have invented certain new and useful Improvements in Packing-Cases, of which the following is a specification, reference being had therein to the accompanying drawings, in which—

Figure 1:
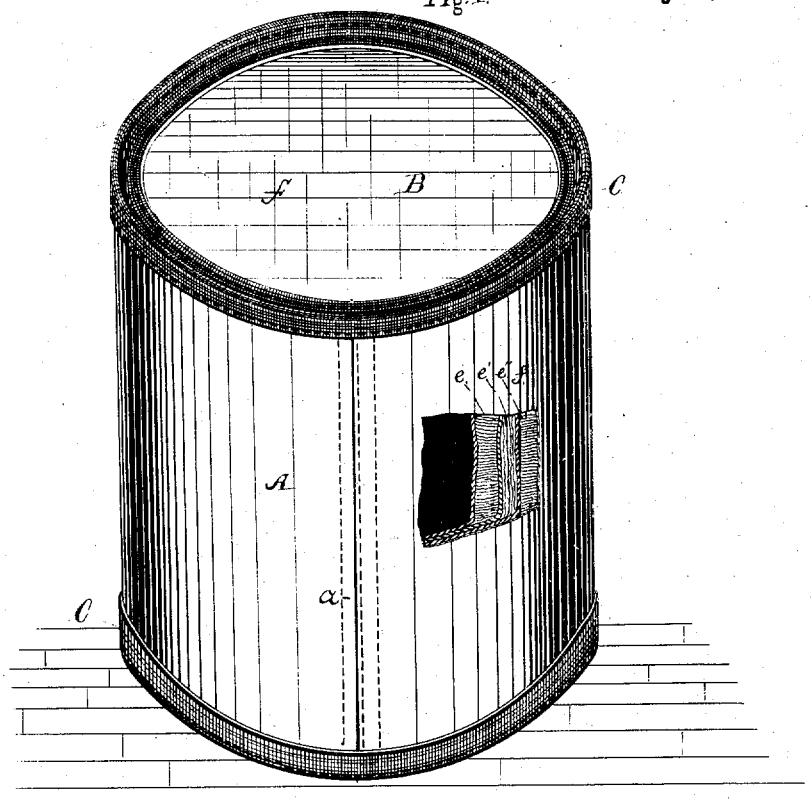
Figure 2:
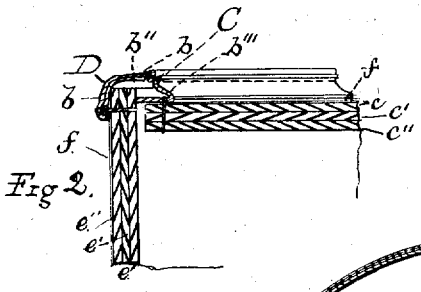
Figure 3:
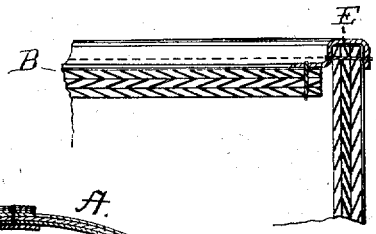
Figure 4:
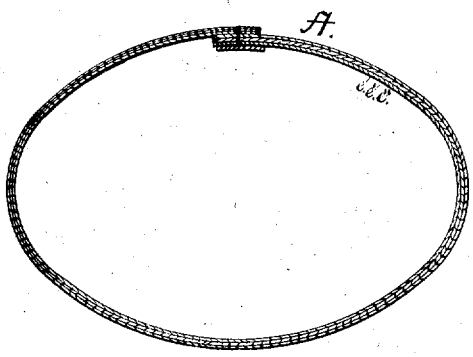

Figure 1 is a perspective view of the packing-case; and Figs. 2 and 3 are sectional views on an enlarged scale, showing the joints between the body and heads. Fig. 4 is a horizontal sectional view of the packing-case, showing the same fully.

My invention relates to packages or packing-cases for containing general merchandise and designed to subserve the same ends as bagging, burlaps, or plank cases at a greatly-reduced cost.

While the packing-case about to be described is, by reason of its cheapness, pliability, toughness, and strength, adapted for general use, it is, in the form shown, more particularly designed for containing fertilizers, which, on account of their corrosive action and pungent and offensive odor, may not be kept in stock in bagging.

In practice I form the body A of the packing-case of several (two or more) layers of veneer, *c c′ c″*, having the grain crossed in the usual way, and cemented together by a mixture consisting of about eleven parts of pitch to one of dead-oil, or by any other suitable cement. The side seam, *a*, is stitched or cemented, stitching being preferred. An outer cover of paper, *f*, may be pasted over the outer sheet of veneer. The top and bottom B are formed of veneer layers *c c′ c″*, and may have a paper cover, *f*. The top and bottom or heads are made slightly smaller in cross-section than the body A, leaving an annular space all round, as shown.

To the edges of the walls A are secured strips of burlaps or equivalent strong textile fabric by stitching D, or in any other convenient way, the flap *b″* covering the edges of the walls and being in turn covered by the flap *b*. A similar strip, *b‴*, is secured to the edge of the heads B, and is secured by overseaming C to the flap *b*. The annular space between the heads and walls is covered by the projecting edge of the flap *b‴*, as shown. As an alternative I secure the heads to the walls by a single flap, E, (see Fig. 3,) stitched to the heads and both sides of the edge of the walls. In either case the joint between the heads and body is closed in such a manner as to prevent any loss of the contents of the packing-case while admitting of a slight yielding or giving of the walls or body without straining the heads, and furnishing a soft and yielding rim to receive impacts or blows, and upon which the case may be trundled as a barrel.

In packing fertilizers in the case, by preference, a strip of veneer is laid longitudinally of the seam on the inside, and a layer of some material not liable to be corroded or attacked—such as thin wood or thick paper—is laid between the heads and contents.

In applying the invention to the construction of cotton-bale covers I make the textile-fabric rim somewhat broader to give a fair hold for the hooks used in handling the bales, and for this use, as well as for all others in which the case is designed to hold inflammable or combustible material, I treat it with tungstate of soda ($Na_2WO_3$) or equivalent material, and use an incombustible cement for securing the veneers.

The case fills a want long felt by dealers in fertilizers, as the bagging now used is liable to corrode and rot, and is permeable to the odor of the material. Country-store keepers, for these reasons, are frequently unwilling to keep fertilizers for sale, and farmers are compelled to order in quantities from the dealers, and many sales are lost by reason of the comparatively greater cost of the material when ordered in small quantities, such as would often be purchased for use on the garden or truck patch, if the fertilizer could be bought at the country store. The case, by reason of its pliability, is stronger than plank, practically impervious to water, is unattacked by materials which will corrode bagging, and is nearly as cheap as paper, besides being very light.

Obviously the packing-case may be of any desired shape and size; but for containing pulverulent materials—such as fertilizers—it is by preference cylindrical, as that shape affords the greatest facility for handling.

What I claim is—

1. A packing-case consisting of a pliable veneer body, to which the heads are united by textile fabric secured to the heads and to the body by stitches.

2. A packing-case whose head is united to the body by means of textile fabric, and having an open space between the edge of the head and the body, substantially as and for the purpose set forth.

3. The packing-case herein described, consisting of a body constructed of two or more layers of veneer cemented together, and having its head united to the body by a band of textile fabric stitched to the head and to the body, and united over the edge of the body, substantially as set forth.

4. A packing-case having strips of textile fabric secured to the outer edge of the body and to the rim of the head, and stitched together over the edge of the walls, forming a yielding rim for trundling and to receive blows or impacts, substantially as set forth.

5. In combination with a body of a packing-case having a textile-fabric flap secured thereto, a head having a similar flap secured near its edge, the said flaps being united and covering an annular space between the body and head, substantially as set forth.

In testimony whereof I affix my signature in presence of two witnesses.

RALPH S. JENNINGS.

Witnesses:
WM. B. S. GAY,
W. H. MEARS.